US010827511B2

(12) United States Patent
Blasco Serrano et al.

(10) Patent No.: US 10,827,511 B2
(45) Date of Patent: Nov. 3, 2020

(54) METHODS OF SELECTIVELY DECODING SCHEDULING ASSIGNMENTS AND/OR SIDELINK DATA TRANSMISSIONS AND RELATED WIRELESS COMMUNICATION DEVICES

(71) Applicant: Telefonaktiebolaget LM Ericsson (publ), Stockholm (SE)

(72) Inventors: Ricardo Blasco Serrano, Espoo (FI); Stefano Sorrentino, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/335,322

(22) PCT Filed: Sep. 26, 2017

(86) PCT No.: PCT/SE2017/050934
§ 371 (c)(1),
(2) Date: Mar. 21, 2019

(87) PCT Pub. No.: WO2018/063061
PCT Pub. Date: Apr. 5, 2018

(65) Prior Publication Data
US 2019/0320447 A1    Oct. 17, 2019

Related U.S. Application Data

(60) Provisional application No. 62/401,544, filed on Sep. 29, 2016.

(51) Int. Cl.
*H04W 72/12*    (2009.01)
*H04W 76/14*    (2018.01)
(Continued)

(52) U.S. Cl.
CPC ....... *H04W 72/1242* (2013.01); *H04L 5/0082* (2013.01); *H04W 4/40* (2018.02); *H04W 72/1278* (2013.01); *H04W 76/14* (2018.02)

(58) Field of Classification Search
CPC ........... H04W 72/1289; H04W 76/023; H04W 72/1263; H04W 72/12; H04W 56/002;
(Continued)

(56) References Cited

U.S. PATENT DOCUMENTS

2013/0157676 A1    6/2013  Baek et al.
2015/0382324 A1*  12/2015  Sheng ................... H04W 72/02
                                                  370/329

(Continued)

FOREIGN PATENT DOCUMENTS

KR    20130070661 A    6/2013
KR    20140142237 A1   12/2014
WO    WO 2013138010 A1  9/2013

OTHER PUBLICATIONS

International Search Report and Written Opinion of the International Searching Authority, PCT/SE2017/050934, dated Dec. 4, 2017, 13 pages.

(Continued)

*Primary Examiner* — Jung Liu
(74) *Attorney, Agent, or Firm* — Sage Patent Group

(57) ABSTRACT

Methods of operating a wireless communication device providing sidelink communications are discussed. Decoded scheduling assignments may be provided for a plurality of sidelink data transmissions of a transmission time interval. Each of the decoded scheduling assignments may correspond to a respective one of the plurality of sidelink data transmissions of the TTI, and the decoded scheduling assignments may be based on scheduling assignments that are received with the plurality of sidelink data transmissions during the TTI. A subset of the plurality of sidelink data (Continued)

transmissions to be decoded may be identified, and each of the sidelink data transmissions of the subset may be selectively decoded.

18 Claims, 3 Drawing Sheets

(51) Int. Cl.
*H04W 4/40* (2018.01)
*H04L 5/00* (2006.01)

(58) Field of Classification Search
CPC ... H04W 76/14; H04W 72/1242; H04W 4/40; H04W 72/1278; H04W 72/048; H04L 5/003; H04L 5/0082
See application file for complete search history.

(56) References Cited

U.S. PATENT DOCUMENTS

| | | |
|---|---|---|
| 2016/0044665 A1 | 2/2016 | Novlan et al. |
| 2016/0073408 A1 | 3/2016 | Sartori et al. |
| 2016/0353478 A1* | 12/2016 | Kim ..................... H04W 72/12 |
| 2017/0188391 A1* | 6/2017 | Rajagopal ......... H04W 74/0816 |
| 2018/0013521 A1* | 1/2018 | Lee ....................... H04L 1/1851 |
| 2019/0327732 A1* | 10/2019 | Yoon ................. H04W 72/0446 |

OTHER PUBLICATIONS

Intel Corporation, On Overlap of Multiple D2D Resource Pools and UE Behavior, 3GPP TSG RAN WG1 Meeting #79, San Francisco, USA, Nov. 17-21, 2014, R1-144652, 6 Pages.
Intel Corporation, On Overlap of Different Types of D2D Resource Pools, 3GPP TSG RAN WG1 Meeting #79, San Francisco, USA, Nov. 17-21, 2014, R1-144677, 4 Pages.
Ericsson, Sidelink Resource Allocation in V2X, 3GPP TSG-RAN WG2 #93, Malta, Feb. 15-19, 2016, R2-161566, 10 Pages.
Intel Corporation, Scheduling assignment for sidelink V2V communication, 3GPP TSG RAN WG1 Meeting #86, Gothenburg, Sweden, Aug. 22-26, 2016, R1-166516, 10 Pages.
Korean Notice of Preliminary Rejection dated Jun. 30, 2020 for Korean Patent Application No. 2019-7011051, 14 pages including English translation.
3GPP TR 36.885 v14.0.0 (Jun. 2016), $3^{rd}$ Generation Partnership Project; Technical Specification Group Radio Access Network, Study on LTE-based V2X Services (Release 14), 216 pages.

* cited by examiner

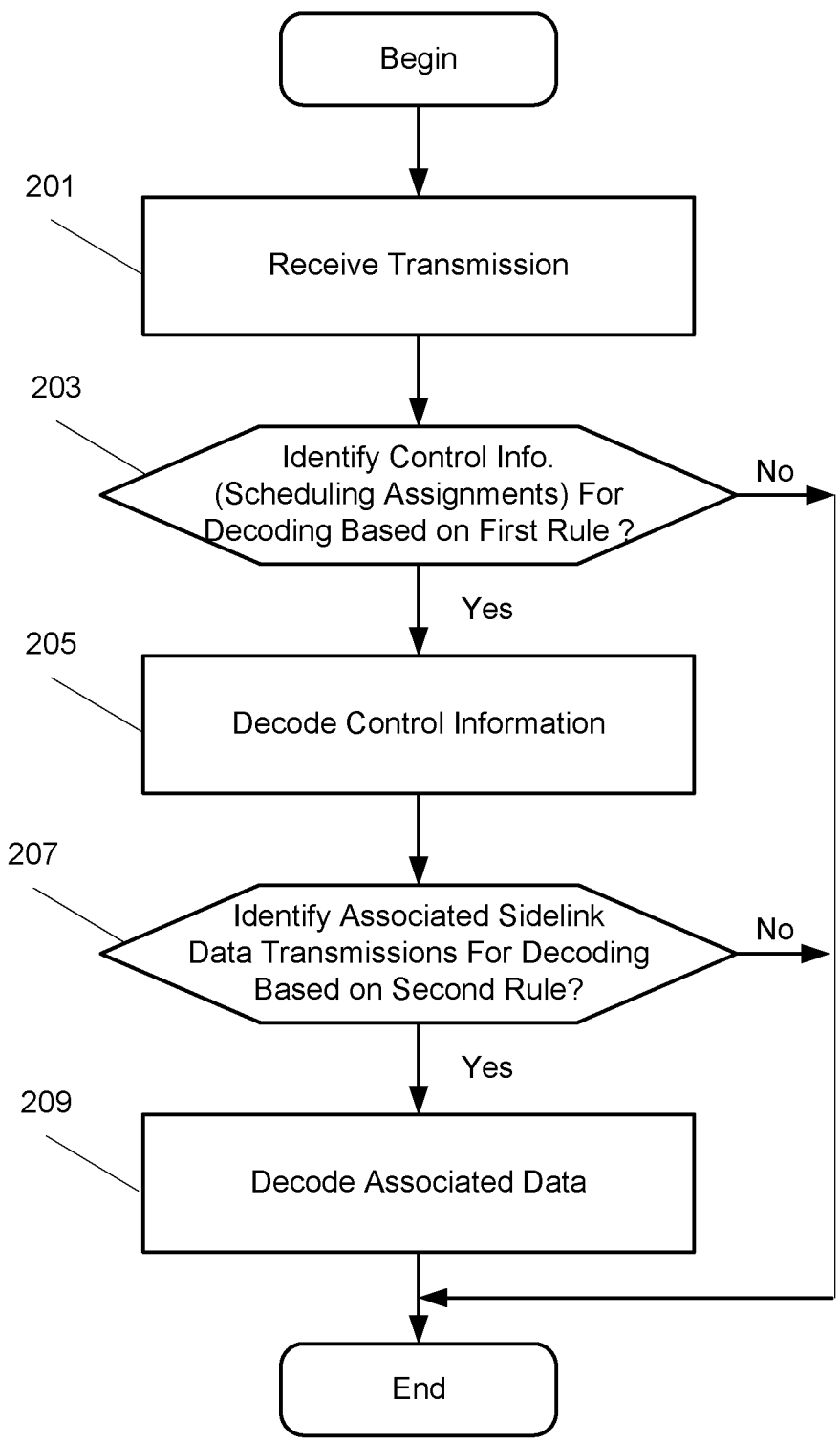

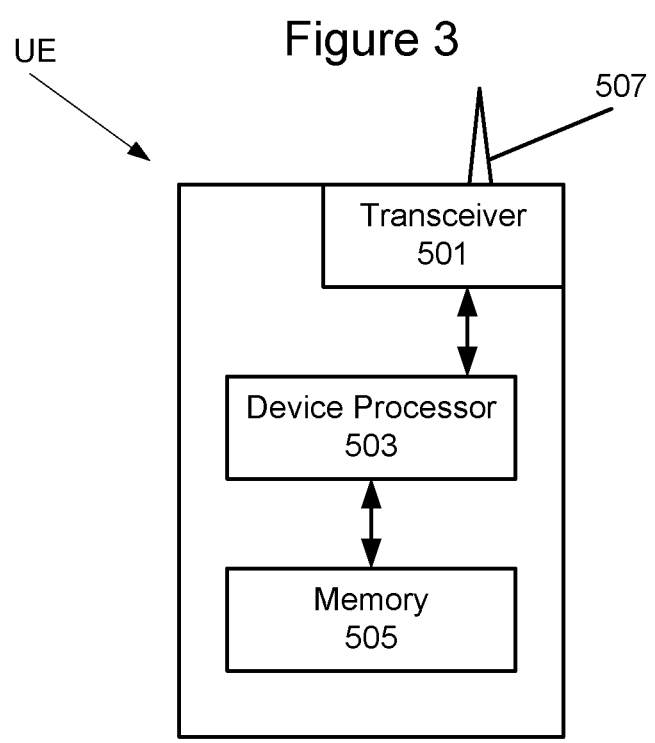

METHODS OF SELECTIVELY DECODING SCHEDULING ASSIGNMENTS AND/OR SIDELINK DATA TRANSMISSIONS AND RELATED WIRELESS COMMUNICATION DEVICES

CROSS REFERENCE TO RELATED APPLICATIONS

This application is a 35 U.S.C. § 371 national stage application of PCT International Application No. PCT/SE2017/050934 filed on Sep. 26, 2017, which in turn claims domestic priority to U.S. Provisional Patent Application No. 62/401,544, filed on Sep. 29, 2016, the disclosures and content of which are incorporated by reference herein in their entirety.

TECHNICAL FIELD

The present disclosure relates generally to communications, and more particularly, to wireless communications and related wireless communication devices.

BACKGROUND

During Release 12, the LTE (Long Term Evolution) standard has been extended with support of device-to-device (D2D) (specified as "sidelink") features targeting both commercial and Public Safety applications. Some applications enabled by Rel-12 LTE include device discovery, where devices are able to sense the proximity of another device and associated application by broadcasting and detecting discovery messages that carry device and application identities. Another application includes direct communication based on physical channels terminated directly between devices.

One of the potential extensions for device-to-device work includes support of V2x (vehicle to anything) communication, which includes any combination of direct communication between vehicles, pedestrians, and/or infrastructure. V2x communication may take advantage of a NW (network) infrastructure, when available, but at least basic V2x connectivity should be possible even in case of lack of coverage. Providing an LTE-based V2x interface may be economically advantageous because of the LTE economies of scale, and it may enable tighter integration between communications with NW infrastructure (vehicle-to-infrastructure V2I communications), with pedestrians (vehicle-to-pedestrian V2P communications), and/or with other vehicles (vehicle-to-vehicle V2V communications), as compared with using a dedicated V2x technology.

FIG. 1 is a schematic diagram illustrating V2x scenarios for an LTE-based Radio Access Network NW. As shown in FIG. 1, V2I (vehicle-to-infrastructure) communications may be provided between a vehicle and the radio access network (RAN), V2V (vehicle-to-vehicle) communications may be provided directly between different vehicles (without communicating through the radio access network), and V2P (vehicle-to-pedestrian) communications may be provided directly between a vehicle and a device held/carried by the pedestrian (e.g., a smartphone, a tablet computer, etc.). V2X communications are meant to include any/all of V2I, V2P, and V2V communications.

V2x communications may carry both non-safety and safety information, where each of the applications and services may be associated with specific requirements sets (e.g., in terms of latency, reliability, capacity, etc.).

The European Telecommunication Standards Institute ETSI has defined two types of messages for road safety: Co-operative Awareness Messages (CAMs) and Decentralized Environmental Notification Messages (DENMs).

CAM: The CAM message is intended to enable vehicles, including emergency vehicles, to notify their presence and other relevant parameters in a broadcast fashion. Such messages target other vehicles, pedestrians, and infrastructure, and are handled by their applications. A CAM message also serves as active assistance to safety driving for normal traffic. The availability of a CAM message is indicatively checked for every 100 ms, yielding a maximum detection latency requirement of <=100 ms for most messages. However, the latency requirement for Pre-crash sensing warning is 50 ms.

DENM: The DENM message is event-triggered, such as by braking, and the availability of a DENM message is also checked for every 100 ms, and the requirement of maximum latency is <=100 ms.

The package size of CAM and DENM messages may vary from 100+ to 800+ bytes, and a typical size may be around 300 bytes. The message is supposed to be detected by all vehicles in proximity.

The SAE (Society of the Automotive Engineers) also defined the Basic Safety Message (BSM) for DSRC with various message sizes defined.

According to the importance and urgency of the messages, the BSMs are further classified into different priorities.

For transmission and reception of V2X packets according to current agreements in 3GPP, for every transmission of a transport block (TB), a UE transmits:

A scheduling assignment (SA) containing control information that is used to decode the TB. This transmission takes place using the Physical Sidelink Control Channel (PSCCH). The SA uses a predefined format and occupies 2 contiguous RBs.

The data packet uses the Physical Sidelink Shared Channel (PSSCH). The format and bandwidth (i.e., number of RBs) used by PSSCH can be chosen by the transmitter to meet the corresponding requirements (e.g., reliability, power constraints, etc.).

Transmission of separate SA and data may simplify receiver design without reducing scheduling flexibility for the transmitter. An LTE-V2X receiver may be expected to blindly attempt to decode the SAs, which are transmitted on predefined parts of the spectrum. The receiver may only attempt to decode data packets if there are corresponding (correctly decoded) SAs.

Regarding supported bandwidths and UE processing capabilities, 3GPP has discussed supporting bandwidths up to 20 MHz (100 RBs) for LTE-V2X. In general, wider bandwidths may include a larger number of resources that may be used for transmission of SAs. For example:

For a 1.4 MHz (6 RBs) carrier, a single SA can be transmitted per TTI (transmission time interval). This means that every UE is expected to blindly decode 1 PSCCH (2 RBs) per TTI, potentially containing an SA. In addition, the UE may be expected to decode 4 RBs containing data. In summary, the UE is expected to decode one PSCCH per TTI and up to 6 RBs per TTI.

For a 20 MHz (100 RBs) carrier, up to 20 different SAs may be transmitted per TTI. This means that every UE is expected to blindly decode 20 PSCCHs (40 RBs), potentially containing one SA each. If only a single SA is transmitted and this SA schedules a transmission of the rest of the carrier, then the UE is expected to decode 98 RBs. That is, the UE is expected to decode 20 PSCCHs per TTI and up to 138 RBs per TTI. 3GPP is currently discussing the capabilities required for a UE. Two types of capabilities are being discussed:

The minimum number of PSCCH that the UE is expected to decode per subframe.

The minimum number of RBs that the UE is expected to decode per subframe.

With the intention to reduce UE complexity, it is possible that 3GPP agrees on UE capabilities that are below the requirements outlined above for the worst case (20 MHz). Accordingly, a given UE may be unable to process all scheduling assignments and/or all data transmissions during a given TTI.

Approaches described in the Background section could be pursued, but are not necessarily approaches that have been previously conceived or pursued. Therefore, unless otherwise indicated herein, the approaches described in the Background section are not prior art to the inventive embodiments disclosed in this application and are not admitted to be prior art by inclusion in the Background section. Therefore, any description contained in the Background section may be moved to the Detailed Description section.

SUMMARY

According to some embodiments of inventive concepts, methods may be provided to operate a wireless communication device (UE) providing sidelink communications with other wireless communication devices. Decoded scheduling assignments for a plurality of sidelink data transmissions of a transmission time interval (TTI) may be provided wherein each of the decoded scheduling assignments corresponds to a respective one of the plurality of sidelink data transmissions of the TTI. A subset of the plurality of sidelink data transmissions may be identified to be decoded based on information received by the wireless communication device UE before the TTI and/or before providing the decoded scheduling assignments, based on measurements corresponding to the decoded scheduling assignments, based on measurements of the plurality of sidelink data transmissions, based on a random selection from the decoded scheduling assignments, based on a random selection from the plurality of sidelink data transmissions, and/or based on information included in and/or associated with at least one of the decoded scheduling assignments. Each of the sidelink data transmissions of the subset may be selectively decoded.

According to some other embodiments of inventive concepts, methods may be provided to operate a wireless communication device (UE) providing sidelink communications with other wireless communication devices. A plurality of scheduling assignments associated with a respective plurality of sidelink data transmissions of a transmission time interval (TTI) may be received. A subset of the plurality of scheduling assignments to be decoded may be identified based on information received by the wireless communication device UE before the TTI and/or before providing the decoded scheduling assignments, based on measurements corresponding to the decoded scheduling assignments, based on a random selection from the plurality of scheduling assignments, based on a pattern of selection that changes for different TTIs, and/or based on a priority of control channels associated with the scheduling assignments. The subset of the plurality of scheduling assignments may be decoded to provide a plurality of decoded scheduling assignments. At least one of the plurality of sidelink data transmissions of the TTI may be decoded based on a respective one of the decoded scheduling assignments.

According to still other embodiments of inventive concepts, a wireless communication device may include a transceiver configured to provide wireless communications over a radio interface, and a processor coupled to the transceiver. The processor may be configured to provide decoded scheduling assignments for a plurality of sidelink data transmissions of a transmission time interval (TTI. Each of the decoded scheduling assignments may correspond to a respective one of the plurality of sidelink data transmissions of the TTI, and the decoded scheduling assignments may be based on scheduling assignments that are received with the plurality of sidelink data transmissions during the TTI. The processor may also be configured to identify a subset of the plurality of sidelink data transmissions to be decoded, and to selectively decoode each of the sidelink data transmissions of the subset.

According to yet other embodiments of inventive concepts, a wireless communication device may include a transceiver configured to provide wireless communications over a radio interface, and a processor coupled to the transceiver. The processor may be configured to receive a plurality of scheduling assignments associated with a respective plurality of sidelink data transmissions of a transmission time interval (TTI), and the scheduling assignments may be received with the plurality of sidelink data transmissions during the TTI. The processor may also be configured to identify a subset of the plurality of scheduling assignments to be decoded. The processor may be further configured to decode the subset of the plurality of scheduling assignments to provide a plurality of decoded scheduling assignments, and to decode at least one of the plurality of sidelink data transmissions of the TTI based on a respective one of the decoded scheduling assignments. According to some embodiments of inventive concepts, a wireless device may prioritize scheduling assignments and/or data transmission to be received/decoded in a given TTI, for example, if the wireless device has limited decoding/receiving capabilities. Moreover, by appropriately prioritizing scheduling assignments and/or data transmissions, a probability that a receiving UE systematically skips decoding transmissions originating from a same transmitting UE may be reduced.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings:

FIG. 2 is a flow chart illustrating operations of wireless communication devices according to some embodiments of inventive concepts; and FIG. 3 is a block diagram illustrating a wireless communication device according to some embodiments of inventive concepts.

DETAILED DESCRIPTION

Figure 1:
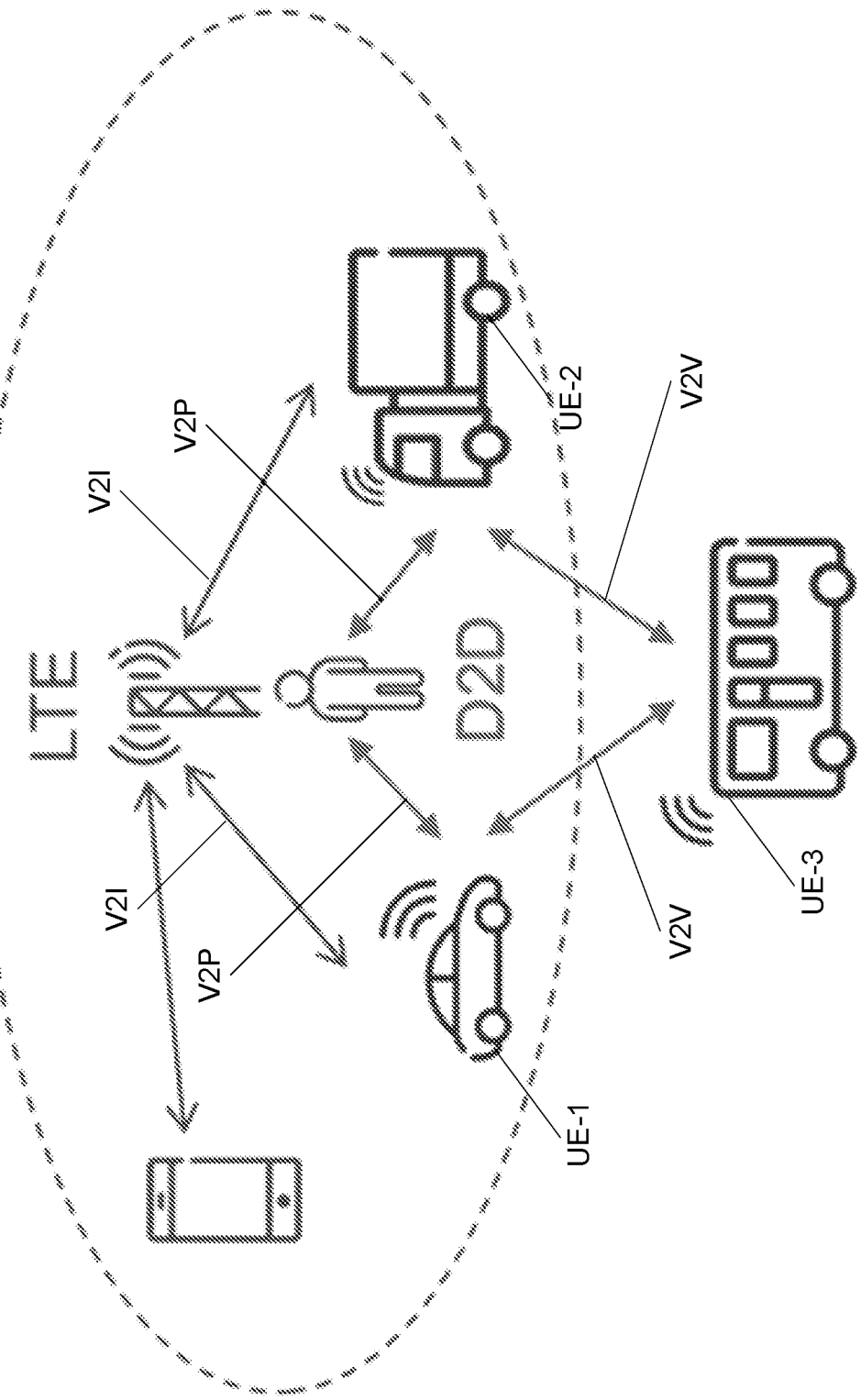
FIG. 1 is a schematic diagram illustrating communication scenarios using sidelink V2X communications within a coverage area of an LTE-based radio access network NW.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

FIG. 3 is a block diagram illustrating elements of a wireless communication device UE (also referred to as a wireless device, a wireless terminal, a wireless communication terminal, user equipment, or a user equipment node/terminal/device) configured to provide V2X communication according to embodiments of inventive concepts. As shown, wireless communication device UE may include a transceiver circuit 501 (also referred to as a transceiver) including a transmitter and a receiver configured to provide uplink and downlink radio communications with a base station of a radio access network, and to provide V2X sidelink communications directly with other V2X wireless communication devices. Wireless communication device may also include a processor circuit 503 (also referred to as a processor) coupled to the transceiver circuit, and a memory circuit 505 (also referred to as memory) coupled to the processor circuit. The memory circuit 505 may include computer readable program code that when executed by the processor circuit 503 causes the processor circuit to perform operations according to embodiments disclosed herein. According to other embodiments, processor circuit 503 may be defined to include memory so that a separate memory circuit is not required. Wireless communication device UE may also include an interface (such as a user interface) coupled with processor 503, and/or wireless communication device UE may be incorporated in a vehicle.

As discussed herein, operations of wireless communication device UE may be performed by processor 503 and/or transceiver 501. For example, processor 503 may control transceiver 501 to transmit communications through transceiver 501 over a radio interface to another UE and/or to receive communications through transceiver 501 from another UE over a radio interface. Moreover, modules may be stored in memory 505, and these modules may provide instructions so that when instructions of a module are executed by processor 503, processor 503 performs respective operations (e.g., operations discussed below with respect to FIG. 2 and/or Example Embodiments).

If the UE requirements on PSCCH decodings per TTI and number of RBs decoded per TTI are below what is needed to decoding in a worst case, then it may be useful to define prioritization rules. That is, the UE may need a way of skipping decoding some of the received transmissions.

In Rel-12/13 Sidelink, it is left up to UE implementation to decide how to prioritize reception of the signals if the UE minimum capabilities were exceeded. Since Rel-12/13 primarily relates to public safety services with a small number of UEs transmitting simultaneously, this was an acceptable behavior. Note that leaving this behavior up to UE implementation may allow for systematically skipping decoding transmissions on certain RBs (e.g., the receiver may decode transmissions from RB with lowest index until RB with highest index or until its capabilities are exhausted). For Rel-12/13, it was not very important to define the behavior in detail because the underlying traffic patterns and the (random) scheduling protocol likely ensure that transmissions originating from different UEs are skipped throughout time (as opposed to skipping all the transmissions from the same UE), if necessary.

In contrast, Rel-14 Sidelink targets V2X services with high UE densities with recurrent traffic patterns. In addition, the agreed scheduling protocol (based on semi-persistent transmission) prioritizes having UEs transmit repeatedly on the same resources. Thus, certain simple skipping rules (like the one described in the previous paragraph) may result in a UE behavior that continuously skips decoding messages originating from the same transmitter.

Some embodiments of inventive concepts disclosed herein include methods to skip decoding transmissions based on rules. A first rule defines conditions to skip decoding transmissions of control information (e.g., PSCCHs). A second rule defines conditions to skip decoding data transmissions. Different embodiments of such rules are presented herein, including:

A Random rule;
A Rule defined by a pattern;
A Rule using a measurement;
A Rule using previously decoded information;
A Rule using higher layer information; and
A Rule based on priority.

Some embodiments of inventive concepts disclosed herein may reduce a probability that a receiving UE systematically skips decoding the transmissions originating from the same transmitting UE.

Some embodiments of inventive concepts disclosed herein include methods to skip decoding transmissions. One such method may include:

1. A UE decides to decode a control information transmission containing an SA (e.g., a PSCCH) based on a first rule.
2. A UE decides to skip decoding a data transmission associated with some control information (e.g., an SA) based on a second rule.

FIG. 2 is a flow chart illustrating methods according to some embodiments of inventive concepts. At block 201, wireless device UE may receive a plurality of D2D transmissions (including scheduling assignments and respective data transport blocks) in a Transmission Time Interval TTI. At block 203, wireless device UE may decide for each scheduling assignment of the control information whether to decode the scheduling assignment based on a first rule. Responsive to deciding to decode a scheduling assignment based on the first rule at block 203, wireless device UE may decode the scheduling assignment at block 205. Responsive to deciding to not decode a scheduling assignment based on the first rule at block 203, wireless device UE may disregard that scheduling assignment. Responsive to decoding the scheduling assignment, wireless terminal UE may decide whether to decode the associated data transport block based on a second rule at block 207. Responsive to deciding to decode the associated data transport block, wireless device UE may decode the associated data transport block at block 209. Responsive to deciding to not decode the associated data transport block at block 207, wireless device UE may disregard the associated data transport block.

Different embodiments of inventive concepts and rules of blocks 203 and 207 are discussed in greater detail below. Note that in some embodiments, only one of the two rules may be active. For example, the receiver UE may always prioritize decoding control information and use the remaining decoding resources to decode data transmissions. Note also that the prioritization may only be used/needed in certain subframes or pools or in general resources where the receiver has insufficient capabilities to attempt detection of all incoming transmissions. Whether a rule is applied or not and which rule is applied may be determined as a function of a system parameter (e.g., bandwidth, an index such as pool index, etc.), as a function of a measurement (e.g., received power, observed congestion level, etc.), etc.

Embodiments of the first rule of block 203 may include:

A. In some embodiments, the first rule of block 203 may include not skipping any decoding of the control information scheduling assignments. This means that the method uses the second rule only.

B. In some embodiments, the first rule of block 203 may use previously decoded/detected information to skip detection of a second transmission of a scheduling assignment. Of course this rule may be best applied to a case where the receiver UE is aware of the resources used to transmit the second transmission. For example:

a. In some embodiments, the first rule may include skipping decoding the control information scheduling assignment if part of/all the information has previously been successfully decoded. For example, in LTE-V2V, a transport block TB may be transmitted twice. A control information scheduling assignment accompanies each transmission of the TB in different transmission time intervals. If the control information scheduling assignment accompanying the first transmission of the TB is successfully decoded, then it is not necessary to decode the control information scheduling assignment accompanying the second transmission. Similarly, the control information scheduling assignment may be obtained from previous transmissions in some cases if semi-persistent transmission is used.

b. In some embodiments, the first rule may include skipping decoding the control information scheduling assignment if the associated data TB has already been successfully decoded. For example, in LTE-V2V, a TB may be transmitted twice. If the TB is successfully decoded after the first transmission, then it is not necessary to decode the control information scheduling assignment accompanying the second transmission of the TB.

c. In some embodiments, the first rule may include skipping decoding the transmissions based on some higher layer information. For example, the receiving UE may use a previously decoded packet to obtain the position of the transmitter UE. Then receiver UE may skip the transmissions of the UE/UEs located furthest away or beyond some distance threshold.

C. In some embodiments, the first rule may use a measurement. For example:

a. In some embodiments, the first rule includes skipping decoding scheduling assignment transmissions based on some measurement. For example, the UE may rank the scheduling assignment transmissions based on the received power or energy of the control channel scheduling assignments. Then, the UE may skip scheduling assignment transmissions associated with lowest power or energy values (e.g., because they are further away in a radio propagation sense). Note that the measurement may consider variations in transmit power or transmit power spectral density.

D. Other embodiments:

a. In some embodiments, the first rule may include skipping decoding the control information scheduling assignments in a (pseudo) random way.

b. In some embodiments, the first rule may include skipping decoding scheduling assignment transmissions using a pattern that ensures that scheduling assignment transmissions on different resources are skipped over time. For example, scheduling assignment transmissions may be skipped over time based on the index of the channel on which the control information scheduling assignment is transmitted (e.g., first skip the scheduling assignment transmission on control channel with index 1, second skip the scheduling assignment transmission on control channel with index 2, etc. When the last control channel index is reached, the pattern starts again with index 1). Other similar rules such as cyclic shift rules may be used.

c. In some embodiments, the first rule may include skipping decoding scheduling assignment transmissions based on a priority indication (e.g., associated with a pool or a control channel index). For example, the UE may first skip some of or all the lowest priority scheduling assignment transmissions; if this is not sufficient, the UE may then skip some of or all the second lowest priority scheduling assignment transmissions; and so on.

d. In some embodiments, the first rule may include skipping decoding scheduling assignment transmissions based on the retransmission index for the associated transmitted TB. For example, the receiver UE may skip detection of scheduling assignment transmissions associated with retransmission of a TB that has already been received at least once, even though the data TB may not have been detected successfully at the first attempt.

Note that different embodiments may be combined in different ways, including the following:

The first rule may be defined by first applying an embodiment from group B and then an embodiment from group C or group D.

For Embodiment C, if different transmissions have the same measurement, then selection may be performed at random.

For Embodiment D.c, if different transmissions have the same priority level, then selection may be performed at random.

For Embodiment D.c, if different transmissions have the same priority level, then selection may be performed based on some measurement.

Embodiments of the second rule of block 207 may include:

A. In some embodiments, the second rule may include not skipping any decoding of the data information. This means that the method may only use the first rule.

B. In some embodiments, the second rule may use previously decoded/detected information. For example:

a. In some embodiments, the second rule may include skipping decoding data that has already been decoded successfully. For example, in LTE-V2V, a TB may be transmitted twice. If the TB is successfully decoded after the first transmission, then it is not necessary to decode the second transmission of the TB.

b. In some embodiments, the second rule may include skipping decoding the transmissions based on some information in the associated scheduling assignment. For example, based on a random field in the SA (e.g., a DMRS cyclic shift).
  c. In some embodiments, the second rule may include skipping decoding the transmissions based on some higher layer information. For example, the receiving UE may use a previously decoded packet to obtain the position of the transmitter. Then UE may skip the transmissions of the UEs located furthest away.
  d. In some embodiment, the second rule may include skipping decoding the data TB transmission based on presence or the contents of an SA of another transmission. For example, if a second SA is decoded and this SA overlaps (significantly or totally) with the data TB transmission, then the receiver may decide to skip decoding the data TB transmission. Alternatively, consider the application of the second rule to decide whether to decode a first data transmission. If an SA scheduling a second transmission that partially or totally overlaps with the first data transmission, then the receiver UE may decide to skip decoding the latter.
C. In some embodiments, the second rule may use a measurement. For example:
  a. In some embodiments, the second rule may include skipping decoding the transmissions based on some measurement. For example, the UE may rank the transmission based on a measurement of the received power or energy of the data channel and/or of the associated control channel. Then it may skip the transmissions associated with lowest power or energy values (e.g., because they are further away in a radio propagation sense). Note that the measurement may consider variations in transmit power or transmit power spectral density.
D. Other embodiments:
  a. In some embodiments, the second rule may include skipping decoding data transmissions in a (pseudo) random way.
  b. In some embodiments, the second rule may include skipping decoding data transmissions using a pattern that ensures that data transmissions on different resources are skipped over time. For example, data transmissions may be skipped over time based on the index of the channel on which the associated control information scheduling assignment is transmitted (e.g., first skip the data transmission associated with control channel scheduling assignment index 1, second skip the transmission associated control channel scheduling assignment index 2, etc. When the last control channel scheduling assignment index is reached, it starts again with index 1).
  c. In some embodiments, the second rule may include skipping decoding the transmissions based on a priority indication (e.g., associated with a pool or a control channel index; or contained in the SA). For example, the UE may first skip some of or all the lowest priority data transmissions; if this is not sufficient, the UE may then skip some of or all the second lowest priority data transmissions; and so on. (Note that in some cases, the priority information may be contained in the associated scheduling assignment, and thus this embodiment may also fit in group B).

Note that different embodiments may be combined in different ways, including the following:

The second rule may be defined by first applying an embodiment from group B and then an embodiment from group C or group D.

For Embodiment C.a, if different data transmissions have the same measurement, then selection may be performed at random.

For Embodiment D.c, if different data transmissions have the same priority level, then selection may be performed at random.

For Embodiment D.c, if different data transmissions have the same priority level, then selection may be performed based on some measurement.

According to some embodiments of inventive concepts, methods for skipping decoding of scheduling assignment transmissions and/or data transmissions may be based on a rule.

Example Embodiments are discussed below.

1. A method of operating a wireless communication device (UE) providing sidelink communications, the method comprising: providing (205) decoded scheduling assignments for a plurality of sidelink data transmissions of a transmission time interval, TTI, wherein each of the decoded scheduling assignments corresponds to a respective one of the plurality of sidelink data transmissions of the TTI; identifying (207) a subset of the plurality of sidelink data transmissions to be decoded based on information received by the wireless communication device UE before the TTI and/or before providing the decoded scheduling assignments, based on measurements corresponding to the decoded scheduling assignments, based on measurements of the plurality of sidelink data transmissions, based on a random selection from the decoded scheduling assignments, based on a random selection from the plurality of plurality of sidelink data transmissions, and/or based on information included in and/or associated with at least one of the decoded scheduling assignments; and selectively decoding (209) each of the sidelink data transmissions of the subset.

2. The method of any of Embodiments 1 and 40, wherein identifying the subset comprises identifying the subset of the plurality of sidelink data transmissions based on information received by the wireless communication device (UE) before the TTI and/or before providing the decoded scheduling assignments.

3. The method of Embodiment 2, wherein identifying the subset comprises identifying each of the subset of the plurality of sidelink data transmissions as not being a retransmission of a previously decoded sidelink data transmission.

4. The method of any of Embodiments 2-3, wherein identifying the subset comprises identifying the subset based on information received from respective sources of the plurality of sidelink data transmissions before the TTI.

5. The method of Embodiment 4, wherein the information received from the respective sources of the plurality of sidelink data transmissions comprises respective position information for each of the sources of the plurality of sidelink data transmissions.

6. The method of Embodiment 5, wherein the subset corresponds to sources that are relatively near to the wireless communication device.

7. The method of any of Embodiments 1-6 and 40, wherein identifying the subset comprises identifying the subset of the plurality of sidelink data transmissions based on measurements corresponding to the decoded scheduling assignments, and/or based on measurements of the plurality of sidelink data transmissions.

8. The method of Embodiment 7, wherein identifying the subset comprises generating a measurement of power and/or energy of each of the plurality of scheduling assignments, wherein identifying the subset comprises identifying sidelink data transmissions corresponding to respective scheduling assignments having relatively high measurements of power and/or energy.

9. The method of Embodiment 7, wherein identifying the subset comprises generating a measurement of power and/or energy of each of the plurality of sidelink data transmissions, wherein identifying the subset comprises identifying sidelink data transmissions of the plurality having relatively high measurements of power and/or energy.

10. The method of any of Embodiments 1-9 and 40, wherein identifying the subset comprises identifying the subset of the plurality of sidelink data transmissions based on a random selection from the decoded scheduling assignments and/or based on a random selection from the plurality of plurality of sidelink data transmissions.

11. The method of any of Embodiments 1-10 and 40, wherein identifying the subset comprises identifying the subset of the plurality of sidelink data transmissions based on information included in and/or associated with at least one of the decoded scheduling assignments.

12. The method of Embodiment 11, wherein identifying the subset comprises identifying the subset based on information of a first one of the decoded scheduling assignments indicating an overlap in time and frequency between a respective first one of the plurality of sidelink data transmissions associated with the first decoded scheduling assignment and a second one of the decoded scheduling assignments associated with a second one of the plurality of sidelink data transmissions and/or indicating an overlap in time and frequency between a respective first one of the plurality of sidelink data transmissions associated with the first decoded scheduling assignment and a second one of the plurality of sidelink data transmissions.

13. The method of Embodiment 12, wherein the subset includes the first sidelink data transmission, or wherein the subset includes the second sidelink data transmission.

14. The method of Embodiment 11, wherein each of the decoded scheduling assignments includes a respective field, and wherein the subset includes sidelink data transmissions corresponding to respective decoded scheduling assignments having respective field values greater than a threshold, or wherein the subset includes sidelink data transmissions corresponding to respective decoded scheduling assignments having respective field values less than the threshold.

15. The method of Embodiment 14, wherein the field of each decoded scheduling assignment comprises a random value, or wherein the field of each decoded scheduling assignment comprises a modulation indicator indicating a modulation order of the respective sidelink data transmission.

16. The method of Embodiment 11, wherein each of the decoded scheduling assignments is associated with a parameter, and wherein identifying the subset comprises identifying the subset of the plurality of sidelink data transmissions based on the respective parameters.

17. The method of Embodiment 16, wherein the parameter associated with each of the decoded scheduling assignments comprises respective demodulation reference signal having a respective cyclic shift, and wherein identifying the subset comprises identifying the subset of the plurality of sidelink data transmissions based on the respective cyclic shifts.

18. The method of Embodiment 11, wherein each of the decoded scheduling assignments includes a respective priority value, wherein the subset includes sidelink data transmissions corresponding to respective decoded scheduling assignments having a first priority value and wherein sidelink data transmissions corresponding to respective decoded scheduling assignments having a second priority are excluded from the subset.

19. The method of any of Embodiments 1-18 and 39-40, further comprising: receiving a plurality of scheduling assignments, wherein providing the decoded scheduling assignments comprises decoding at least some of the plurality of scheduling assignments.

20. The method of any of Embodiments 1-18 and 39-40, further comprising: receiving (201) a plurality of scheduling assignments; and identifying (203) a subset of the plurality of scheduling assignments to be decoded based on information received by the wireless communication device UE before the TTI and/or before providing the decoded scheduling assignments, based on measurements corresponding to the decoded scheduling assignments, based on a random selection from the plurality of scheduling assignments, based on a pattern of selection that changes for different TTIs, and/or based on a priority of control channels associated with the scheduling assignments; wherein providing the decoded scheduling assignments comprises decoding the subset of the plurality of scheduling assignments to provide the decoded scheduling assignments.

21. The method of Embodiment 20, wherein identifying the subset of the plurality of scheduling assignments comprises identifying the subset based on information received by the wireless communication device UE before the TTI and/or before receiving the plurality of scheduling assignments.

22. The method of Embodiment 21, wherein identifying the subset of the plurality of scheduling assignments comprises identifying each of the subset of the plurality of scheduling assignments as not corresponding to a retransmission of a previously decoded sidelink data transmission.

23. The method of any of Embodiments 21-22, wherein identifying the subset of the plurality of scheduling assignments comprises identifying the subset based on information received from respective sources of the plurality of scheduling assignments before the TTI.

24. The method of Embodiment 23, wherein the information received from the respective sources of the plurality of scheduling assignments comprises respective position information for each of the sources of the plurality of scheduling assignments.

25. The method of Embodiment 24, wherein the subset of the plurality of scheduling assignments corresponds to sources that are relatively near to the wireless communication device.

26. The method of Embodiment 21, wherein identifying the subset of the plurality of scheduling assignments comprises identifying each of the subset of the plurality of scheduling assignments as not corresponding to a retransmission of a sidelink data transmission for which a previous scheduling assignment has been decoded.

27. The method of any of Embodiments 20-26, wherein identifying the subset of the plurality of scheduling assignments comprises identifying the subset based on measurements corresponding to the plurality of scheduling assignments.

28. The method of Embodiment 27, wherein identifying the subset of the plurality of scheduling assignments comprises generating a measurement of power and/or energy of each of the plurality of scheduling assignments, wherein identifying the subset comprises identifying scheduling assignments having relatively high measurements of power and/or energy.

29. The method of any of Embodiments 20-28, wherein identifying the subset of the plurality of scheduling assignments comprises identifying the subset based on a random selection from the plurality of scheduling assignments.

30. The method of any of Embodiments 20-29, wherein identifying the subset of the plurality of scheduling assignments comprises identifying the subset based on a pattern of selection that changes for different TTIs.

31. The method of any of Embodiments 20-30, wherein identifying the subset of the plurality of scheduling assignments is based on a priority of control channels associated with the scheduling assignments 32. The method of any of Embodiments 20-31, wherein the subset of the plurality of scheduling assignments is a first subset, wherein identifying comprises identifying a second subset of the plurality of scheduling assignments to skip during decoding, and wherein selectively decoding comprises selectively decoding each of the scheduling assignments of the first subset without attempting to decode the scheduling assignments of the second subset.

33. The method of any of Embodiments 20-32, wherein receiving the plurality of scheduling assignments comprises receiving the plurality of scheduling assignments using a Physical Sidelink Control Channel (PSCCH).

34. The method of any of embodiments 1-33 and 39-40, wherein the wireless communication device is a V2x wireless communication device, and wherein each of the plurality of data transmissions is a broadcast V2x data transmission.

35. The method of any of Embodiments 1-34 and 39-40, wherein the subset of the plurality of sidelink data transmissions is a first subset, wherein identifying comprises identifying a second subset of the plurality of sidelink data transmissions to skip during decoding, and wherein selectively decoding comprises selectively decoding each of the sidelink data transmissions of the first subset without attempting to decode the sidelink data transmissions of the second subset.

36. The method of any of Embodiments 1-35 and 39-40 further comprising: before identifying the subset of the plurality of sidelink data transmissions, receiving (201) the plurality of sidelink data transmissions using a Physical Sidelink Shared Channel (PSSCH).

37. The method of any of Embodiments 1-36, wherein the decoded scheduling assignments are based on scheduling assignments that are received with the plurality of sidelink data transmissions during the TTI.

38. The method of any of Embodiments 1-37 and 39-40, wherein the wireless communication device is configured to provide the sidelink communications with other wireless communication devices.

39. A method of operating a wireless communication device (UE) providing sidelink communications, the method comprising: providing (205) decoded scheduling assignments for a plurality of sidelink data transmissions of a transmission time interval, TTI, wherein each of the decoded scheduling assignments corresponds to a respective one of the plurality of sidelink data transmissions of the TTI, and wherein the decoded scheduling assignments are based on scheduling assignments that are received with the plurality of sidelink data transmissions during the TTI; identifying (207) a subset of the plurality of sidelink data transmissions to be decoded; and selectively decoding (209) each of the sidelink data transmissions of the subset.

40. The method of Embodiment 39, wherein identifying the subset comprises identifying the subset of the plurality of sidelink data transmissions to be decoded based on information received by the wireless communication device UE before the TTI and/or before providing the decoded scheduling assignments, based on measurements corresponding to the decoded scheduling assignments, based on measurements of the plurality of sidelink data transmissions, based on a random selection from the decoded scheduling assignments, based on a random selection from the plurality of plurality of sidelink data transmissions, and/or based on information included in and/or associated with at least one of the decoded scheduling assignments.

41. A method of operating a wireless communication device (UE) providing sidelink communications, the method comprising: receiving (201) a plurality of scheduling assignments associated with a respective plurality of sidelink data transmissions of a transmission time interval (TTI); identifying (203) a subset of the plurality of scheduling assignments to be decoded based on information received by the wireless communication device UE before the TTI and/or before providing the decoded scheduling assignments, based on measurements corresponding to the decoded scheduling assignments, based on a random selection from the plurality of scheduling assignments, based on a pattern of selection that changes for different TTIs, and/or based on a priority of control channels associated with the scheduling assignments; decoding (205) the subset of the plurality of scheduling assignments to provide a plurality of decoded scheduling assignments; and decoding (209) at least one of the plurality of sidelink data transmissions of the TTI based on a respective one of the decoded scheduling assignments.

42. The method of Embodiments 41 and 80, wherein identifying the subset of the plurality of scheduling assignments comprises identifying the subset based on information received by the wireless communication device (UE) before the TTI and/or before receiving the plurality of scheduling assignments.

43. The method of Embodiment 42, wherein identifying the subset of the plurality of scheduling assignments comprises identifying each of the subset of the plurality of scheduling assignments as not corresponding to a retransmission of a previously decoded sidelink data transmission.

44. The method of any of Embodiments 42-43, wherein identifying the subset of the plurality of scheduling assignments comprises identifying the subset based on information received from respective sources of the plurality of scheduling assignments before the TTI.

45. The method of Embodiment 44, wherein the information received from the respective sources of the plurality of scheduling assignments comprises respective position information for each of the sources of the plurality of scheduling assignments.

46. The method of Embodiment 45, wherein the subset of the plurality of scheduling assignments corresponds to sources that are relatively near to the wireless communication device.

47. The method of Embodiment 42, wherein identifying the subset of the plurality of scheduling assignments comprises identifying each of the subset of the plurality of scheduling assignments as not corresponding to a retransmission of a sidelink data transmission for which a previous scheduling assignment has been decoded.

48. The method of any of Embodiments 41-47 and 80, wherein identifying the subset of the plurality of scheduling assignments comprises identifying the subset based on measurements corresponding to the plurality of scheduling assignments.

49. The method of Embodiment 48, wherein identifying the subset of the plurality of scheduling assignments comprises generating a measurement of power and/or energy of each of the plurality of scheduling assignments, wherein identifying the subset comprises identifying scheduling assignments having relatively high measurements of power and/or energy.

50. The method of any of Embodiments 41-49 and 80, wherein identifying the subset of the plurality of scheduling assignments comprises identifying the subset based on a random selection from the plurality of scheduling assignments.

51. The method of any of Embodiments 41-50 and 80, wherein identifying the subset of the plurality of scheduling assignments comprises identifying the subset based on a pattern of selection that changes for different TTIs.

52. The method of any of Embodiments 41-51 and 80, wherein identifying the subset of the plurality of scheduling assignments is based on a priority of control channels associated with the scheduling assignment.

53. The method of any of Embodiments 41-52 and 79-80, wherein the subset of the plurality of scheduling assignments is a first subset, wherein identifying comprises identifying a second subset of the plurality of scheduling assignments to skip during decoding, and wherein selectively decoding comprises selectively decoding each of the scheduling assignments of the first subset without attempting to decode the scheduling assignments of the second subset.

54. The method of any of Embodiments 41-53 and 79-80, wherein receiving the plurality of scheduling assignments comprises receiving the plurality of scheduling assignments using a Physical Sidelink Control Channel (PSCCH).

55. The method of any of Embodiments 41-54 and 79-80, wherein each of the decoded scheduling assignments corresponds to a respective one of the plurality of sidelink data transmissions of the TTI, the method further comprising: identifying (207) a subset of the plurality of the sidelink data transmissions of the TTI to be decoded based on information received by the wireless communication device UE before the TTI and/or before decoding the subset of scheduling assignments, based on measurements corresponding to the decoded scheduling assignments, based on measurements of the plurality of sidelink data transmissions, based on a random selection from the decoded scheduling assignments, based on a random selection from the plurality of plurality of sidelink data transmissions, and/or based on information included in and/or associated with at least one of the decoded scheduling assignments; wherein decoding the at least one of the plurality of sidelink data transmissions comprises selectively decoding each of the sidelink data transmissions of the subset.

56. The method of Embodiment 55, wherein identifying the subset of the plurality of the sidelink data transmissions comprises identifying the subset of the plurality of sidelink data transmissions based on information received by the wireless communication device (UE) before the TTI and/or before providing the decoded scheduling assignments.

57. The method of Embodiment 56, wherein identifying the subset of the plurality of the sidelink data transmissions comprises identifying each of the subset of the plurality of sidelink data transmissions as not being a retransmission of a previously decoded sidelink data transmission.

58. The method of any of Embodiments 56-57, wherein identifying the subset of the plurality of the sidelink data transmissions comprises identifying the subset based on information received from respective sources of the plurality of sidelink data transmissions before the TTI.

59. The method of Embodiment 58, wherein the information received from the respective sources of the plurality of sidelink data transmissions comprises respective position information for each of the sources of the plurality of sidelink data transmissions.

60. The method of Embodiment 59, wherein the subset of the plurality of the sidelink data transmissions corresponds to sources that are relatively near to the wireless communication device.

61. The method of any of Embodiments 55-60, wherein identifying the subset of the plurality of the sidelink data transmissions comprises identifying the subset of the plurality of sidelink data transmissions based on measurements corresponding to the decoded scheduling assignments, and/or based on measurements of the plurality of sidelink data transmissions.

62. The method of Embodiment 61, wherein identifying the subset of the plurality of the sidelink data transmissions comprises generating a measurement of power and/or energy of each of the plurality of scheduling assignments, wherein identifying the subset comprises identifying sidelink data transmissions corresponding to respective scheduling assignments having relatively high measurements of power and/or energy.

63. The method of Embodiment 61, wherein identifying the subset of the plurality of the sidelink data transmissions comprises generating a measurement of power and/or energy of each of the plurality of sidelink data transmissions, wherein identifying the subset comprises identifying sidelink data transmissions of the plurality having relatively high measurements of power and/or energy.

64. The method of any of Embodiments 55-63, wherein identifying the subset of the plurality of the sidelink data transmissions comprises identifying the subset of the plurality of sidelink data transmissions based on a random selection from the decoded scheduling assignments and/or based on a random selection from the plurality of plurality of sidelink data transmissions.

65. The method of any of Embodiments 55-64, wherein identifying the subset of the plurality of the sidelink data transmissions comprises identifying the subset of the plurality of sidelink data transmissions based on information included in and/or associated with at least one of the decoded scheduling assignments.

66. The method of Embodiment 65, wherein identifying the subset of the plurality of the sidelink data transmissions comprises identifying the subset based on information of a first one of the decoded scheduling assignments indicating an overlap in time and frequency between a respective first one of the plurality of sidelink data transmissions associated with the first decoded scheduling assignment and a second one of the decoded scheduling assignments associated with a second one of the plurality of sidelink data transmissions and/or indicating an overlap in time and frequency between a respective first one of the plurality of sidelink data transmissions associated with the first decoded scheduling assignment and a second one of the plurality of sidelink data transmissions.

67. The method of Embodiment 66, wherein the subset of the plurality of the sidelink data transmissions includes the first sidelink data transmission, or wherein the subset includes the second sidelink data transmission.

68. The method of Embodiment 65, wherein each of the decoded scheduling assignments includes a respective field, and wherein the subset of the plurality of the sidelink data transmissions includes sidelink data transmissions corresponding to respective decoded scheduling assignments having respective field values greater than a threshold, or wherein the subset includes sidelink data transmissions corresponding to respective decoded scheduling assignments having respective field values less than the threshold.

69. The method of Embodiment 68, wherein the field of each decoded scheduling assignment comprises a random value, or wherein the field of each decoded scheduling assignment comprises a modulation indicator indicating a modulation order of the respective sidelink data transmission.

70. The method of Embodiment 65, wherein each of the decoded scheduling assignments is associated with a parameter, and wherein identifying the subset comprises identifying the subset of the plurality of sidelink data transmissions based on the respective parameters.

71. The method of Embodiment 70, wherein the parameter associated with each of the decoded scheduling assignments comprises respective demodulation reference signal having a respective cyclic shift, and wherein identifying the subset comprises identifying the subset of the plurality of sidelink data transmissions based on the respective cyclic shifts.

72. The method of Embodiment 65, wherein each of the decoded scheduling assignments includes a respective priority value, wherein the subset of the plurality of the sidelink data transmissions includes sidelink data transmissions corresponding to respective decoded scheduling assignments having a first priority value and wherein sidelink data transmissions corresponding to respective decoded scheduling assignments having a second priority are excluded from the subset.

73. The method of any of Embodiments 55-72, further comprising: receiving a plurality of scheduling assignments, wherein providing the decoded scheduling assignments comprises decoding at least some of the plurality of scheduling assignments.

74. The method of any of embodiments 41-73 and 79-80, wherein the wireless communication device is a V2x wireless communication device, and wherein each of the plurality of data transmissions is a broadcast V2x data transmission.

75. The method of any of Embodiments 41-74 and 79-80, wherein the subset of the plurality of sidelink data transmissions is a first subset, wherein identifying comprises identifying a second subset of the plurality of sidelink data transmissions to skip during decoding, and wherein selectively decoding comprises selectively decoding each of the sidelink data transmissions of the first subset without attempting to decode the sidelink data transmissions of the second subset.

76. The method of any of Embodiments 41-75 and 79-80, further comprising: before identifying the subset of the plurality of sidelink data transmissions, receiving (201) the plurality of sidelink data transmissions using a Physical Sidelink Shared Channel (PSSCH).

77. The method of any of Embodiments 41-76, wherein the scheduling assignments are received with the plurality of sidelink data transmissions during the TTI.

78. The method of any of Embodiments 41-77 and 79-80, wherein the wireless communication device is configured to provide the sidelink communications with other wireless communication devices.

79. A method of operating a wireless communication device (UE) providing sidelink communications, the method comprising: receiving (201) a plurality of scheduling assignments associated with a respective plurality of sidelink data transmissions of a transmission time interval (TTI), wherein the scheduling assignments are received with the plurality of sidelink data transmissions during the TTI; identifying (203) a subset of the plurality of scheduling assignments to be decoded; decoding (205) the subset of the plurality of scheduling assignments to provide a plurality of decoded scheduling assignments; and decoding (209) at least one of the plurality of sidelink data transmissions of the TTI based on a respective one of the decoded scheduling assignments.

80. The method of Embodiment 79, wherein identifying the subset comprises identifying the subset of the plurality of scheduling assignments to be decoded based on information received by the wireless communication device UE before the TTI and/or before providing the decoded scheduling assignments, based on measurements corresponding to the decoded scheduling assignments, based on a random selection from the plurality of scheduling assignments, based on a pattern of selection that changes for different TTIs, and/or based on a priority of control channels associated with the scheduling assignments.

81. A wireless communication device (UE) comprising: a transceiver (501) configured to provide wireless communications over a radio interface; and a processor (503) coupled to the transceiver, wherein the processor is configured to perform operations according to any of Embodiments 1-80.

82. A wireless communication device (UE) adapted to perform according to any of Embodiments 1-80.

83. A wireless communication device (UE) comprising modules adapted to perform according to any of Embodiments 1-80.

84. A wireless communication device (UE) configured to provide sidelink communications, the wireless communication device comprising: a decoded scheduling assignment providing module adapted to provide decoded scheduling assignments for a plurality of sidelink data transmissions of a transmission time interval, TTI, wherein each of the decoded scheduling assignments corresponds to a respective one of the plurality of sidelink data transmissions of the TTI; a sidelink data transmission identification module adapted to identify a subset of the plurality of sidelink data transmissions to be decoded based on information received by the wireless communication device UE before the TTI and/or before providing the decoded scheduling assignments, based on measurements corresponding to the decoded scheduling assignments, based on measurements of the plurality of sidelink data transmissions, based on a random selection from the decoded scheduling assignments, based on a random selection from the plurality of plurality of sidelink data transmissions, and/or based on information included in and/or associated with at least one of the decoded scheduling assignments; and a selective decoding module adapted to selectively decode each of the sidelink data transmissions of the subset.

85. The wireless communication device of Embodiment 84, wherein the decoded scheduling assignment providing module, the sidelink data transmission identification module, and/or the selective decoding module are adapted to perform according to any of Embodiments 2-38.

86. A wireless communication device (UE) configured to provide sidelink communications, the wireless communication device comprising: a receiving module adapted to receive a plurality of scheduling assignments associated with a respective plurality of sidelink data transmissions of a transmission time interval (TTI); a subset identification module adapted to identify a subset of the plurality of scheduling assignments to be decoded based on information received by the wireless communication device UE before the TTI and/or before providing the decoded scheduling assignments, based on measurements corresponding to the decoded scheduling assignments, based on a random selection from the plurality of scheduling assignments, based on a pattern of selection that changes for different TTIs, and/or based on a priority of control channels associated with the scheduling assignments; a subset decoding module adapted to decode the subset of the plurality of scheduling assignments to provide a plurality of decoded scheduling assignments; and a sidelink data transmission decoding module adapted to decode at least one of the plurality of sidelink data transmissions of the TTI based on a respective one of the decoded scheduling assignments.

87. The wireless communication device of Embodiment 86, wherein the receiving module, the subset identification module, the subset decoding module, and/or the sidelink data transmission decoding module are adapted to perform according to any of Embodiments 42-76.

Explanations for Abbreviations used herein are provided below.
3G Third Generation of Mobile Telecommunications Technology
BSM Basic Safety Message
BW Bandwidth
CAM Cooperative Awareness Message
CDMA Code-Division Multiple Access
D2D Device-to-Device Communication
DENM Decentralized Environmental Notification Message
DSRC Dedicated Short-Range Communications
eNB eNodeB
ETSI European Telecommunications Standards Institute
FDMA Frequency-Division Multiple Access
GLONASS Global Navigation Satellite System
GSM Global System for Mobile Communications
GPS Global Positioning System
LTE Long-Term Evolution
NW Network
OFDM Orthogonal-Frequency-Division Multiplexing
PSBCH Physical Sidelink Broadcast CHannel
PSCCH Physical Sidelinnk Control CHannel
PSSCH Physical Sidelinnk Shared CHannel
TA Timing Advance
TDMA Time-Division Multiple Access
TB Transport Block
TF Transport Format
UTC Coordinated Universal Time
SAE Society of the Automotive Engineers
UE User Equipment
V2I Vehicle-to-Infrastructure
V2P Vehicle-to-Pedestrian
V2V Vehicle-to-vehicle communication
V2x Vehicle-to-anything-you-can-imagine
Wrt with respect to During RAN1#86, agreement was reached that: a UE is not expected to try to decode more than [100] RBs in a subframe; and a UE is not expected to try to decode more than [10] PSCCHs in a subframe. The exact values have been left for future discussion. In this disclosure, values are considered together with the decoding capabilities of UEs.

UE Decoding Capabilities

LTE-V2V targets safety services. For this reason, it may be important that the receivers do not skip decoding some packets due to limited receiver capabilities. When discussing UE decoding requirements, it may be important to consider that, in practice, DSRC may have no such restrictions. This may be possible due to the TDM operation, which simplifies the receiver design. In general, companies in 3GPP have emphasized the importance of having an LTE-V2X solution that performs substantially better than DSRC.

In general, the OFDMA nature of LTE-V2V may make the calculation of the minimum requirements somewhat cumbersome. In addition, a careful analysis may result in requirements that are never necessary in practice. A reasonable simplification may be to take the following extreme case into consideration:

The UE is expected to decode all PSCCHs present in a subframe. For a 20 MHz carrier and a 5 RB subchannel configuration, this results in 20 PSCCHs and 40 RBs.

The UE is expected to decode a single full bandwidth transmission. For a 20 MHz carrier, this corresponds to 98 RBs.

This may result in the following requirements:
A UE is not expected to try to decode more than 138 RBs in a subframe.
A UE is not expected to try to decode more than 20 PSCCHs in a subframe.

As stated above, these requirements may be obtained through a simplification. In practice, they may not suffice to cover all cases. Consider the following example in a 20 MHz carrier:

UE1 transmits over the entire system bandwidth (i.e., 98 RBs for data)

UE2 transmits over a single subchannel (i.e., 3 RBs for data).

A receiving UE decodes correctly both PSCCH transmissions. It is likely that the UE can also decode correctly the two associated PSSCH transmissions. For example, if UE1 and UE2 are located at the same distance from the receiving UE, the transmission by UE2 will have a higher PSD (since it is narrowband) ensuring a high-enough SNR; whereas the transmission by UE1 will not be severely affected by the narrowband collision. However, for the decoder this may result in the following:

40 RBs are consumed for blind decoding of PSCCHs.
98 RBS are consumed for decoding the data transmission of UE1.
3 RBs are consumed for decoding the data transmission of UE2.

In total, 141 RBs would have to be decoded, exceeding the requirement on 138. In practice, the UE would have to choose which of the two transmissions to decode.

Given the semi-persistent transmission scheme used in LTE-V2V, it is likely that this problem may be repeated over multiple transmissions. It may therefore be important to introduce decoding rules to ensure that the receiver does not systematically skip decoding the transmissions of certain UEs.

Proposals:

Proposal 1: The minimum requirements on UE decoding capabilities are sufficient to ensure decoding of all PSCCHs in a subframe and a full bandwidth data transmission in the same subframe:

A UE is not expected to try to decode more than 138 RBs in a subframe.
A UE is not expected to try to decode more than 20 PSCCHs in a subframe.

Proposal 2: Decoding rules are introduced to ensure that transmissions from a given UE are not systematically dropped.

CONCLUSIONS

The following proposals are disclosed herein:

Proposal 1: The minimum requirements on UE decoding capabilities are sufficient to ensure decoding of all PSCCHs in a subframe and a full bandwidth data transmission in the same subframe:

A UE is not expected to try to decode more than 138 RBs in a subframe.

A UE is not expected to try to decode more than 20 PSCCHs in a subframe.

Proposal 2: Decoding rules are introduced to ensure that transmissions from a given UE are not systematically dropped.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a wireless communication device providing sidelink communications, the method comprising:
providing decoded scheduling assignments for a plurality of sidelink data transmissions of a transmission time interval, TTI, wherein each of the decoded scheduling assignments corresponds to a respective one of the plurality of sidelink data transmissions of the TTI, and wherein the decoded scheduling assignments are based on scheduling assignments that are received with the plurality of sidelink data transmissions during the TTI;
identifying a subset of the plurality of sidelink data transmissions to be decoded, wherein identifying the subset comprises identifying the subset of the plurality of sidelink data transmissions based on information received by the wireless communication device before the TTI and/or before providing the decoded scheduling assignments; and
selectively decoding each of the sidelink data transmissions of the subset.

2. The method of claim 1, wherein identifying the subset further comprises identifying the subset of the plurality of sidelink data transmissions to be decoded based on measurements corresponding to the decoded scheduling assignments, based on measurements of the plurality of sidelink data transmissions, based on a random selection from the decoded scheduling assignments, based on a random selection from the plurality of plurality of sidelink data transmissions, and/or based on information included in and/or associated with at least one of the decoded scheduling assignments.

3. The method of claim 1, wherein identifying the subset comprises identifying each of the subset of the plurality of sidelink data transmissions as not being a retransmission of a previously decoded sidelink data transmission.

4. The method of claim 1, wherein identifying the subset comprises identifying the subset based on information received from respective sources of the plurality of sidelink data transmissions before the TTI.

5. The method of claim 4, wherein the information received from the respective sources of the plurality of sidelink data transmissions comprises respective position information for each of the sources of the plurality of sidelink data transmissions.

6. The method of claim 5, wherein the subset corresponds to sources that are relatively near to the wireless communication device.

7. The method of claim 6, wherein identifying the subset comprises identifying the subset of the plurality of sidelink data transmissions based on measurements corresponding to the decoded scheduling assignments, and/or based on measurements of the plurality of sidelink data transmissions.

8. The method of claim 7, wherein identifying the subset comprises generating a measurement of power and/or energy of each of the plurality of scheduling assignments, wherein identifying the subset comprises identifying sidelink data transmissions corresponding to respective scheduling assignments having relatively high measurements of power and/or energy.

9. The method of claim 7, wherein identifying the subset comprises generating a measurement of power and/or energy of each of the plurality of sidelink data transmissions, wherein identifying the subset comprises identifying sidelink data transmissions of the plurality having relatively high measurements of power and/or energy.

10. A method of operating a wireless communication device providing sidelink communications, the method comprising:
receiving a plurality of scheduling assignments associated with a respective plurality of sidelink data transmissions of a transmission time interval, TTI, wherein the scheduling assignments are received with the plurality of sidelink data transmissions during the TTI;
identifying a subset of the plurality of scheduling assignments to be decoded, wherein identifying the subset of the plurality of scheduling assignments comprises identifying the subset based on information received by the wireless communication device before the TTI and/or before receiving the plurality of scheduling assignments;
decoding the subset of the plurality of scheduling assignments to provide a plurality of decoded scheduling assignments; and
decoding at least one of the plurality of sidelink data transmissions of the TTI based on a respective one of the decoded scheduling assignments.

11. The method of claim 10, wherein identifying the subset further comprises identifying the subset of the plurality of scheduling assignments to be decoded based on measurements corresponding to the decoded scheduling assignments, based on a random selection from the plurality of scheduling assignments, based on a pattern of selection that changes for different TTIs, and/or based on a priority of control channels associated with the scheduling assignments.

12. The method of claim 10, wherein identifying the subset of the plurality of scheduling assignments comprises identifying each of the subset of the plurality of scheduling assignments as not corresponding to a retransmission of a previously decoded sidelink data transmission.

13. The method of claim 10, wherein identifying the subset of the plurality of scheduling assignments comprises identifying the subset based on information received from respective sources of the plurality of scheduling assignments before the TTI.

14. The method of claim 13, wherein the information received from the respective sources of the plurality of scheduling assignments comprises respective position information for each of the sources of the plurality of scheduling assignments.

15. The method of claim 14, wherein the subset of the plurality of scheduling assignments corresponds to sources that are relatively near to the wireless communication device.

16. The method of claim 10, wherein identifying the subset of the plurality of scheduling assignments comprises identifying each of the subset of the plurality of scheduling assignments as not corresponding to a retransmission of a sidelink data transmission for which a previous scheduling assignment has been decoded.

17. The method of claim 10, wherein identifying the subset of the plurality of scheduling assignments further comprises identifying the subset based on measurements corresponding to the plurality of scheduling assignments.

18. A wireless communication device comprising:
a transceiver configured to provide wireless communications over a radio interface; and
a processor coupled to the transceiver, wherein the processor is configured to:
provide decoded scheduling assignments for a plurality of sidelink data transmissions of a transmission time interval, TTI, wherein each of the decoded scheduling assignments corresponds to a respective one of the plurality of sidelink data transmissions of the TTI, and wherein the decoded scheduling assignments are based on scheduling assignments that are received with the plurality of sidelink data transmissions during the TTI;
identify a subset of the plurality of sidelink data transmissions to be decoded, wherein identifying the subset comprises identifying the subset of the plurality of sidelink data transmissions based on information received by the wireless communication device before the TTI and/or before providing the decoded scheduling assignments; and
selectively decode each of the sidelink data transmissions of the subset.

* * * * *